United States Patent Office 2,723,238
Patented Nov. 8, 1955

2,723,238

MANGANESE ZINC FERROSPINEL COMPOSITIONS, INCLUDING COPPER OXIDE

John O. Simpkiss, Jr., Palmyra, N. J., assignor to Radio Corporation of America, a corporation of Delaware No Drawing. Application August 19, 1952,
Serial No. 305,303

4 Claims. (Cl. 252—62.5)

This invention relates to novel compositions of matter in the class of materials known as ferrospinels and to improved articles made of these compositions. More particularly, the invention relates to improved compositions and articles in this class comprising manganese-zinc ferrospinels containing added copper oxide.

Ferrospinels, also commonly called "ferrites" are crystalline materials having a spinel structure and consisting essentially of ferric oxide and at least one other metallic oxide which is usually, although not always, divalent in nature. When molded into compressed bodies, they are usually characterized by relatively high magnetic permeability, but this property varies greatly depending upon the combinations and proportions of the metallic oxides out of which the material has been made.

Among all the possible ferrospinels which it is possible to utilize commercially, the manganese-zinc ferrospinels have been found to be particularly advantageous because of their desirable temperature characteristics, relatively high permeability with low magnetic losses, and good frequency response in the radio frequency region. They are also more economical to manufacture than, for example, the nickel-zinc ferrospinels having comparable magnetic properties. Even with these desirable properties, however, it has been found desirable to be able to increase the saturation permeability of these materials.

The materials of the present invention provide increased magnetic permeability without any appreciable increase in magnetic losses and without sacrifice of good temperature characteristics. This improvement has been brought about by adding up to about 10% of copper oxide to the basic manganese-zinc ferrospinel composition, the copper oxide being incorporated with the crystal lattice of the material.

One object of the present invention is to provide improved manganese-zinc ferrospinels having high saturation permeabilities.

Another object of the invention is to provide ferrospinels of improved magnetic permeability.

Still another object of the invention is to provide improved ferrospinels having relatively high magnetic permeability and which are low in cost.

These and other objects will be more apparent and the invention will be more readily understood from the following detailed description.

Examples of preparation of preferred materials in accordance with the present invention will now be given. These examples include ferrospinel compositions in which a small percentage of copper oxide has been added to a standard mixture of ferric oxide, zinc oxide, and manganese dioxide which has previously been found to produce molded bodies of relatively high permeability at room temperature and also relatively low values of magnetic losses. The method of preparing these materials is entirely conventional.

EXAMPLE 1

A mixture of metallic oxides was prepared in the following proportions, all percentages being by weight: ferric oxide 67%, zinc oxide 10.5%, manganese dioxide 10.5%, manganese dioxide 22.5% and to this mixture was added 2% of copper oxide (CuO). These ingredients were thoroughly mixed and calcined at a temperature of 1025° C. for about 3 hours. The calcined material was then ground by ball-milling for about 5 hours with an amount of water equal to about the weight of the metallic oxides. After the milling operation, the slurry was dried on a steam heated drum dryer to a maximum moisture content of about .5%.

To the finely ground calcine there was then added about 8% by weight of a water emulsion of paraffin wax to serve as a binder, 1% by weight zinc stearate to serve as a molding lubricant and about 20% by weight of water to form a plastic mass. The plastic mass was mixed for about 30 minutes after which it was pelletized and dried to a moisture content of about .25%. This form of the material may then be used either for making finished articles by compression molding or, with some further treatment, to make articles by extrusion molding. Articles made by compression molding are fired at a maximum temperature of about 1250° C. for 1 hour.

EXAMPLE 2

For extrusion molding, the pelletized material made in Example 1 was further treated as follows. To the pelletized material was added 20% by weight of a 2% water solution of sodium carboxy methylcellulose to serve as a water dispersing agent. After thorough mixing of these ingredients, they were extruded in an ordinary extrusion molding apparatus into articles of desired shape. The extrusion molded pieces were dried in air at a temperature of 65° to 80° C. to a maximum moisture content of about 5%. The parts which were thus molded were then fired in a kiln at a temperature of about 1300° C. for about 1 hour. The fired articles were then cooled in an ordinary air atmosphere.

In the case of articles made by either compression molding or extrusion molding, the organic binders and lubricants are first driven off by heating at a temperature of about 600° C. to 700° C. before firing at the higher temperature. This may be done either in a separate oven or in the same kiln used for the high temperature firing. In the latter case, the temperature may simply be raised slowly over a period of several hours.

In the preparation of the materials for the molding process any conventional organic binder may be used. Besides paraffin wax, any other wax, natural resin, or gum, or synthetic resin may be used. As molding lubricants, any metal soap of a long chain fatty acid, amine soaps, partially esterified triethanolamine fatty acid condensation products, and the like, may be used. The water dispersing agent may be omitted, if desired.

High firing temperatures may range from about 950° C. to 1350° C. and the firing may take place for from about 10 minutes to 3 hours or more. The upper limit of firing time is not critical.

The tables below give values for magnetic losses (Q) and inductance (L) for molded bodies made of two different manganese-zinc ferrospinel compositions with and without added copper oxide. The materials were prepared in accordance with the above examples and were molded by extrusion as in Example 2. The series of values given for materials of each composition were for different samples of the same bath. All measurements were made at 1 kc. and 1200 gausses, which is the field strength at which substantial saturation occurs for these materials. The amounts of CuO are expressed as percentages of the rest of the basic oxide mixture.

Table 1

| Composition | Q | L | LQ |
|---|---|---|---|
| 67% Fe₂O₃, 10.5% ZnO, 22.5% MnO₂ | 3.1 | 15.0 | 46.5 |
| | 3.1 | 15.2 | 47.1 |
| | 3.42 | 13.4 | 45.8 |
| | 3.32 | 14.2 | 47.2 |
| | 3.3 | 13.75 | 45.4 |
| | 3.72 | 12.5 | 46.5 |

Table 2

| Composition | Q | L | LQ |
|---|---|---|---|
| 67% Fe₂O₃, 10.5% ZnO, 22.5% MnO₂ + 2% CuO | 3.1 | 15.3 | 47.4 |
| | 3.0 | 15.8 | 47.4 |
| | 3.05 | 15.2 | 46.4 |
| | 2.80 | 16.2 | 45.4 |
| | 2.75 | 16.4 | 45.1 |
| | 2.95 | 15.6 | 46.0 |

Table 3

| Composition | Q | L | LQ |
|---|---|---|---|
| 70% Fe₂O₃, 10% ZnO, 20% MnO₂ | 3.8 | 12.6 | 47.8 |
| | 3.9 | 13.3 | 51.8 |
| | 4.0 | 11.2 | 44.8 |
| | 4.21 | 10.5 | 44.3 |
| | 4.0 | 11.0 | 44.0 |
| | 4.0 | 11.3 | 45.2 |

Table 4

| Composition | Q | L | LQ |
|---|---|---|---|
| 70% Fe₂O₃, 10% ZnO, 20% MnO₂ + 2% CuO | 2.9 | 16.8 | 48.7 |
| | 2.92 | 16.6 | 48.5 |
| | 3.1 | 15.8 | 47.5 |

The values for inductance given in the above tables are measures of the magnetic permeabilities of the bodies. Increasing inductance indicates increasing permeability. The data which have been given show that permeability of the manganese-zinc ferrospinels can be raised by adding small percentages of copper oxide.

All ferrospinel compositions composed of heat reaction product of 67–70% $Fe_2O_3$, 10–10.5% ZnO and 20–22.5% $MnO_2$ may be improved by adding small percentages of copper to them in accordance with the teachings of the invention. A preferred range of percent copper oxide is about 1–5% of the total weight of the other oxides in the compositions. From 0.1 to 10% of the copper oxide can be utilized to obtain improved manganese-zinc ferrospinels in accordance with the invention.

Molded bodies made of the materials which have been described above have been found satisfactory for use as deflection yokes for television kinescopes, other induction coil cores, and transformer cores.

What I claim as my invention:

1. A method of increasing the magnetic permeability of a ferrospinel composition, said composition comprising by weight 67–70% ferric oxide, 10–10.5% zinc oxide and 20–22.5% manganese dioxide, comprising mixing 0.1–10% by weight copper oxide with said ferric, zinc and manganese oxides, and then firing the mixture at a temperature of at least 950° C.

2. A method according to claim 1 in which the amount of said copper oxide is 1–5%.

3. A manganese-zinc-copper ferrospinel composition consisting essentially of the heat reaction product of by weight:

| | Percent |
|---|---|
| $Fe_2O_3$ | 67–70 |
| ZnO | 10–10.5 |
| $MnO_2$ | 20–22.5 |
| CuO | 0.1–10 | the weight of said copper oxide being based on the total weight of said $Fe_2O_3$, ZnO and $MnO_2$.

4. A manganese-zinc-copper ferrospinel composition consisting essentially of the heat reaction product of by weight:

| | Percent |
|---|---|
| $Fe_2O_3$ | 67–70 |
| ZnO | 10–10.5 |
| $MnO_2$ | 20–22.5 |
| CuO | 1–5 | the weight of said copper oxide being based on the total weight of said $Fe_2O_3$, ZnO and $MnO_2$.

No references cited.